United States Patent    [11] 3,619,265

| [72] | Inventors | Michael J. Hammond; Raymond F. Herner, both of Iowanda, Pa. |
|---|---|---|
| [21] | Appl. No. | 803,429 |
| [22] | Filed | Feb. 28, 1969 |
| [45] | Patented | Nov. 9, 1971 |
| [73] | Assignee | GTE Sylvania Incorporated |

[54] RARE EARTH OXIDE HAVING INERT LAYER THEREON AND METHOD OF MAKING SAME
5 Claims, No Drawings

[52] U.S. Cl. .................................................. 117/100 B,
117/33.5 C, 117/33.5 CM, 117/33.5 E, 117/33.5 R, 252/301.4 R
[51] Int. Cl. .................................................. C09k 1/04
[50] Field of Search .................................................. 117/100 B, 33.5 E, 33.5 R, 33.5 C, 33.5 CM; 252/301.4 R

[56] References Cited
UNITED STATES PATENTS

| 2,049,765 | 4/1957 | Cusano et al. ............... | 17/33.5 |
| 3,322,682 | 5/1967 | Thompson .................... | 252/301.4 |
| 3,415,757 | 12/1968 | Wanmaker et al. ............ | 252/301.4 |
| 2,049,765 | 8/1936 | Fischer ......................... | 252/301.4 |
| 3,457,184 | 7/1969 | Kobayashi et al. ............. | 252/301.4 |

FOREIGN PATENTS

| 2,393,963 | 9/1963 | Japan .......................... | 252/301.6 |

*Primary Examiner*—William D. Martin
*Assistant Examiner*—Mathew R. P. Perrone, Jr.
*Attorneys*—Norman J. O'Malley, Donald R. Castle and William H. McNeill

ABSTRACT: A rare earth oxide host phosphor has incorporated thereon an outer layer of chemically combined fluoride ion. The coating increases the adherence properties of the phosphor in slurry application techniques for the manufacture of television screens by preventing poisoning of the phosphor particles by dichromate ions present in the slurry. The phosphor is coated by batching in a .05 molar fluoride bath, in acidic solution, about 400 to 500 grams of phosphor per liter of solution, agitating for about 20 to 30 minutes, and decanting the acidic solution, washing and then filtering and drying the phosphor. The drying temperature should be less than 200° C. to prevent disruption of the coating.

RARE EARTH OXIDE HAVING INERT LAYER THEREON AND METHOD OF MAKING SAME

BACKGROUND OF THE INVENTION

This invention relates to cathodoluminescent materials having enhanced screen adherence properties and to methods of manufacturing these materials.

The invention has particular application to materials comprised of a rare earth oxide host and a rare earth activator selected from the lanthanide series of elements. This group of materials, or phosphors, includes gadolinium oxide ($Gd_2O_3$:A), yttrium oxide ($Y_2O_3$:A), and mixtures of the two, together with an activator, designated generally in the formula as A. While not generally so considered, yttrium, for purposes of this disclosure, is to be considered one of the rare earths. All of the above named materials have strong emission in the red region of the spectrum combined with a brightness considerably in excess of currently employed phosphors used in, for example, color cathode ray tubes. In spite of these obvious qualifications, there has been a general lack of acceptance of these phosphors by tube manufacturers. There are two major reasons for this lack of acceptance, both steming from the two currently employed methods of making color tube screens. These methods are generally distinguished as a dry phosphor deposition method and a slurry application method. The dry phosphor deposition method comprises generally a technique wherein a photosensitized organic binder material such, for example, as polyvinyl alcohol (PVA) sensitized with ammonium dichromate is first applied to the screen area in a tacky condition and the dry phosphor is deposited thereon. Subsequently, the phosphor-coated screen is exposed through a negative to actinic radiation and then developed by steps well understood in the art. The process is repeated for each of the colors needed in the final tube.

The second or slurry method is one wherein the phosphor is mixed with the sensitized PVA to form a slurry, for example, as by ball milling, and this slurry is then applied to the screen area, and then the subsequent steps discussed above are performed to form the screen or a portion thereof. In the dry deposition technique for forming screens, it has been found that a relatively large particle size of phosphor should be utilized to insure adequate uniformity in the screen. This particle size of phosphor should generally be greater than 10 microns. An inherent disadvantage of the rare earth oxide host phosphors is that they are extremely difficult to manufacture in a particle size greater than about 2 microns. This size, however, is just about ideal for slurry applications.

In regard, however, to the slurry applications, it has been found that the adherence properties of the rare earth oxide phosphors are extremely poor. The adherence capabilities degenerate rapidly in direct proportion to the length of time the phosphor exists in the slurry; that is, the shelf life of the slurry is extremely short. Prior to applicants' invention, a slurry mix of a rare earth oxide phosphor was generally limited to a shelf life of around twelve hours. After this time, it is virtually impossible to secure adherence of the phosphor particles to the screen. Furthermore, the longer the phosphor is in the slurry, the more effect there seems to be upon the emission qualities of the phosphor. Other deleterious effects from long slurry shelf life are denoted by a change in body color of the phosphor from white to yellow and a gradual poisoning or killing of the phosphor material per se. Thus, a rare earth oxide host phosphor remaining too long in contact with the sensitized organic binder ceases to be a phosphor and becomes an inert material exhibiting no luminescent properties under cathode ray excitation.

Applicants have found that the poor adherence qualities and the slow poisoning of the phosphor material per se occur because of a reaction between the rare earth oxide host phosphor and the dichromate ion present in the slurry as a photosensitizing agent, If the phosphor is allowed sufficient time in the slurry and the reaction is allowed to go to completion, the end result is no longer a rare earth oxide but a rare earth chromate or dichromate combination.

While the exact nature of the compounds formed by the reaction are not known with any degree of certainty, it is believed that one or more or perhaps all three of the following compounds are formed in various degrees:

$Gd_2(CrO_4)_3$; $Gd_2O_2(CrO_4)$; and $Gd_2O(CrO_4)_2$. The reaction most probably occurring is:

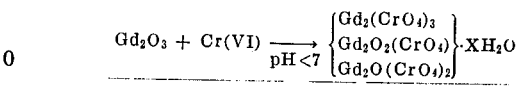

that is, the gadolinium oxide in the presence of Cr(VI) in an acidic carrier will form the various chromate compounds together with some water of hydration.

It has been attempted in the past to enhance the poor adherence qualities of the material and to at least discourage the chromate reaction by applying to the material a particulate coating such, for example, as silica or pyrophosphates; however, without success.

OBJECTS AND SUMMARY OF THE INVENTION

It is therefore an object of the invention to enhance the adherence properties of phosphors in cathode ray tube production.

It is a further object of the invention to enhance the adherence properties of rare earth oxide host phosphors in color cathode ray tube production.

Still another object of the invention is to provide a luminescent material which has these increased adherence properties.

Yet another object of the invention is the provision of a method of making such phosphors.

These objects are accomplished in one aspect of the invention by the provision of a cathodoluminescent material which has thereon an outer layer of chemically combined fluoride ion. The fluoride ion is applied to the phosphor particle by bathing the phosphor in an acidic fluoride solution and then subsequently decanting the solution, washing, filtering and then drying the phosphor.

DESCRIPTION OF THE PREFERRED EMBODIMENTS

For a better understanding of the present invention, together with other and further objects, advantages and capabilities thereof, reference is made to the following disclosure and appended claims.

Referring now to the invention with greater particularity, a luminescent material is provided with a substantially uniform outer layer of chemically combined fluoride ion for the prevention of deleterious reactions with the dichromate ion which will be present in a slurry formulation. The fluoride ion coating is particularly useful when utilized with a luminescent material which comprises at least one rare earth oxide host selected from the group consisting essentially of yttrium oxide, gadolinium oxide and yttrium-gadolinium oxide. The host compound may be activated by at least one of the lanthanide series of elements. In particular the activator may be selected from the group consisting of europium, samarium, and praseodymium.

It has been found that a luminescent material having a chemically combined outer layer of fluoride ion is substantially impervious to the chromate ion reaction and has an increased slurry life of up to 160 hrs. This is in contrast to an untreated rare earth oxide host phosphor which will not make a screen after aging as little as twenty-four hours in a slurry.

The phosphor material has the fluoride ion applied thereto by adding to a greater than 0.03 molar fluoride bath, in aqueous acidic solution, about 400 to 500 grams of the phosphor per liter of solution. An ideal molar concentration is 0.05; however, other higher molar concentrations; e.g. 0.10, may be utilized. A suitable acidic fluoride-containing compound is ammonium bifluoride ($NH_4F \cdot HF$); however, other water-soluble acidic fluorides may be used if desired.

After the phosphor has been added to the solution, the solution is agitated for about 20–30 minutes. Thereafter the acidic solution is decanted, the phosphor is washed, for example in water, and then filtered and dried. The drying step must be carried out at a temperature less than 200° C. to avoid disruption of the fluoride coating. An optimum temperature range has been found to be approximately 125° C. The time of the drying operation is not critical and will vary in accordance with the amount of phosphor being dried.

Cathodoluminescent screens made by the slurry method and utilizing a phosphor of the type described by this invention show virtually no loss in efficiency or light output when operated with a screen potential of 24–25 KV. The phosphor exhibits excellent adherence qualities with little tendency to form pickouts or other deleterious effects on the screen.

Thus there has been provided by this invention luminescent materials having enhanced adhesive properties particularly when used in the formation of cathodoluminescent screens. Furthermore, the invention is particularly applicable to rare earth oxide host phosphors. Further, there has been provided a simple and efficient and economical method of making these phosphors.

While there have been shown and described what are at present considered the preferred embodiments of the invention, it will be obvious to those skilled in the art that various changes and modifications may be made therein without departing from the scope of the invention as defined by the appended claims.

We claim:

1. In a method of coating and improving the screen adherence properties of rare earth oxide host phosphors, the steps comprising: adding to a greater than 0.03 molar fluoride bath, in an acidic solution, about 400 to 500 grams of said phosphor per liter of solution; agitating said solution for about 20 to 30 minutes; decanting said acidic solution; washing said phosphor; and then filtering and drying the coated phosphor.

2. The invention of claim 1 wherein said drying step is carried out at less than 200° C.

3. The invention of claim 2 wherein said drying temperature is approximately 125° C.

4. The invention of claim 1 wherein said solution is $NH_4F \cdot HF$.

5. The invention of claim 1 wherein said phosphor is selected from the group consisting essentially of yttrium oxide, gadolinium oxide, and yttrium-gadolinium oxide.